(12) United States Patent
Stevens et al.

(10) Patent No.: US 9,874,111 B2
(45) Date of Patent: Jan. 23, 2018

(54) LOW THERMAL MASS JOINT

(71) Applicant: United Technologies Corporation, Hartford, CT (US)

(72) Inventors: Michael S. Stevens, Alfred, ME (US); Ken F. Blaney, Middleton, NH (US)

(73) Assignee: United Technologies Corporation, Hartford, CT (US)

( * ) Notice: Subject to any disclaimer, the term of this patent is extended or adjusted under 35 U.S.C. 154(b) by 615 days.

(21) Appl. No.: 14/477,964

(22) Filed: Sep. 5, 2014

(65) Prior Publication Data

US 2015/0068214 A1  Mar. 12, 2015

Related U.S. Application Data

(60) Provisional application No. 61/874,440, filed on Sep. 6, 2013.

(51) Int. Cl.
*F01D 25/24* (2006.01)
*F01D 9/04* (2006.01)
*F01D 25/08* (2006.01)

(52) U.S. Cl.
CPC ......... F01D 25/243 (2013.01); F01D 25/246 (2013.01); *F01D 9/041* (2013.01); *F01D 25/08* (2013.01); *Y02T 50/671* (2013.01)

(58) Field of Classification Search
CPC .. F23R 3/60; F23R 3/283; F23R 3/002; F23R 3/06; F23R 2900/0017; F05D 2260/14; F01D 25/243; F01D 9/041; F01D 25/08; F01D 25/246; Y02T 50/671
See application file for complete search history.

(56) References Cited

U.S. PATENT DOCUMENTS

| | | |
|---|---|---|
| 4,822,244 A | 4/1989 | Maier et al. |
| 4,872,810 A | 10/1989 | Brown et al. |
| 5,228,835 A | 7/1993 | Chlus |
| 5,261,790 A | 11/1993 | Dietz et al. |
| 5,281,097 A | 1/1994 | Wilson et al. |
| 5,310,319 A | 5/1994 | Grant et al. |
| 5,402,636 A * | 4/1995 | Mize .............. F01D 3/00 415/115 |
| 5,403,156 A * | 4/1995 | Arness .......... F01D 5/081 29/889.21 |
| 6,347,508 B1 * | 2/2002 | Smallwood ...... F01D 9/023 60/796 |
| 8,381,533 B2 | 2/2013 | Smoke et al. |
| 2007/0193824 A1 * | 8/2007 | Anderson ........ E06C 9/02 182/8 |

* cited by examiner

*Primary Examiner* — William H Rodriguez
*Assistant Examiner* — William Breazeal
(74) *Attorney, Agent, or Firm* — Carlson, Gaskey & Olds, P.C.

(57) ABSTRACT

A gas turbine engine includes a tangential on-board injector (TOBI) fluidly connected to a compressor section. A diffuser case structurally supports a combustor section and the tangential on-board injector via at least one low thermal mass joint.

5 Claims, 3 Drawing Sheets

LOW THERMAL MASS JOINT

CROSS-REFERENCE TO RELATED APPLICATION

This application claims priority to U.S. Provisional Application No. 61/874,440 filed Sep. 6, 2013.

STATEMENT REGARDING FEDERALLY SPONSORED RESEARCH OR DEVELOPMENT

This invention was made with government support under Contract No. FA8650-09-D-2923-0021 awarded by the United States Air Force. The Government has certain rights in this invention.

BACKGROUND OF THE INVENTION

The present disclosure relates generally to turbine engine support structures and more specifically to a low thermal mass support joint for the same.

Gas turbine engines for aircraft include multiple turbine engine sections that operate cooperatively to generate thrust and propel the aircraft forward. The turbine engine sections are maintained in position by a turbine engine superstructure including a diffuser case. In typical examples, the diffuser case is connected to multiple engine components at a single joint via a flange and fastener arrangement.

Some sections of the turbine engine, such as a turbine on-board injector (TOBI) system, run extremely hot during operation. When one component of a joint is very hot, relative to the temperature at the joint, the large thermal mass of the joint causes significant amounts of heat cycling in the arm connecting the hotter component to the joint. The heat cycling in turn weakens the material of the arm, thereby shortening the effective lifespan of the joint.

Some existing engines address this by isolating the component joints and ensuring that at any given joint, only two components are joined to each other. This in turn reduces the thermal mass of the joint and improves the heat cycling at the joint. Some engines, include strict size limitations. In such engines it is difficult to isolate the joints from each other, resulting in joints having a large thermal mass.

SUMMARY OF THE INVENTION

A gas turbine engine according to an exemplary embodiment of this disclosure, among other possible things includes a compressor section, a combustor section fluidly connected to the compressor section, a turbine section fluidly connected to the combustor section, a tangential on-board injector fluidly connected to the compressor section, and a diffuser case structurally supporting the combustor section and the tangential on-board injector via at least one low thermal mass joint.

In a further embodiment of the foregoing gas turbine engine, each of the low thermal mass joints comprises a diffuser flange connected to a tangential on-board injector flange via a fastener.

In a further embodiment of the foregoing gas turbine engine, the diffuser case further includes at least one diffuser tab at each of the at least one low thermal mass joints, and the at least one diffuser tab contacts a corresponding support finger of the combustor, thereby preventing circumferential movement of the combustor.

In a further embodiment of the foregoing gas turbine engine, at least one diffuser tab includes two diffuser tabs joined by a diffuser tab wall, and the corresponding support finger is positioned between the diffuser tabs.

In a further embodiment of the foregoing gas turbine engine, the combustor section includes a plurality of circumferentially spaced support fingers, and each of the support fingers interfaces with a corresponding low thermal mass joint.

In a further embodiment of the foregoing gas turbine engine, the tangential on-board injector includes a tangential on-board injector hook corresponding to each of the circumferentially spaced support fingers, each tangential on-board injector hook includes a hook section extending radially outward from a tangential on-board injector support section, and the corresponding support finger is received in a gap defined by the tangential on-board injector hook section.

In a further embodiment of the foregoing gas turbine engine, the corresponding support finger is maintained in an axially tight fit between a radially extending face of the tangential on-board injector hook and a radially extending face of a diffusor flange.

A further embodiment of the foregoing gas turbine engine includes a thermal expansion gap between the support finger and an axially extending face of the tangential on-board injector hook.

A further embodiment of the foregoing gas turbine engine includes a diffusor flange protruding radially inward from the diffusor and a tangential on-board injector flange protruding radially inward from the tangential on-board injector, and the diffuser flange and the tangential on-board injector flange are connected via a fastener.

In a further embodiment of the foregoing gas turbine engine, the tangential on-board injector hook and combustor finger interface is offset from the diffuser flange and said tangential on-board injector flange.

A low thermal mass joint for joining two components to a structural support according to an exemplary embodiment of this disclosure, among other possible things includes a structural support flange connected to a flange of a first supported component via a fastener, a hook feature extending from a face of the first supported component, at least one structural support tab extending from the structural support in a direction opposing the structural support flange, a support arm of a second component partially received in an opening defined by a gap between the structural support tab and the hook feature.

A further embodiment of the foregoing low thermal mass joint includes a gap between a portion of the support arm received in the opening and the face of the first supported component.

In a further embodiment of the foregoing low thermal mass joint, the hook feature and the structural support tab are offset from the structural support flange and the flange of the first supported component along the face of the first supported component.

In a further embodiment of the foregoing low thermal mass joint, the at least one structural support tab includes two structural support tabs joined by a structural support wall, and the support arm of the second component is positioned between the structural support tabs.

In a further embodiment of the foregoing low thermal mass joint, the opening defined by the gap between the structural support tab and the hook feature is an interference fit with the support arm of the second component.

A method according to an exemplary embodiment of this disclosure, among other possible things includes joining a flange of a first supported component to a flange of a support component using a fastener, receiving a support arm of a second supported component in a gap defined by a hook extending radially outward from the first supported component and a support structure tab of the support component, and the hook, support structure tab, and the support arm of the second supported structure are radially offset from the flange of the first supported component and the flange of the support component.

A further embodiment of the foregoing method includes the step of providing a thermal expansion gap between the support arm and a face of the first supported component, the face of the first supported component being within the hook.

A further embodiment of the foregoing method includes the step of maintaining a position of the support arm in the gap via an interference fit between a wall of the support structure tab and a face of the hook.

These and other features of the present invention can be best understood from the following specification and drawings, the following of which is a brief description.

DETAILED DESCRIPTION OF AN EMBODIMENT

Figure 1:
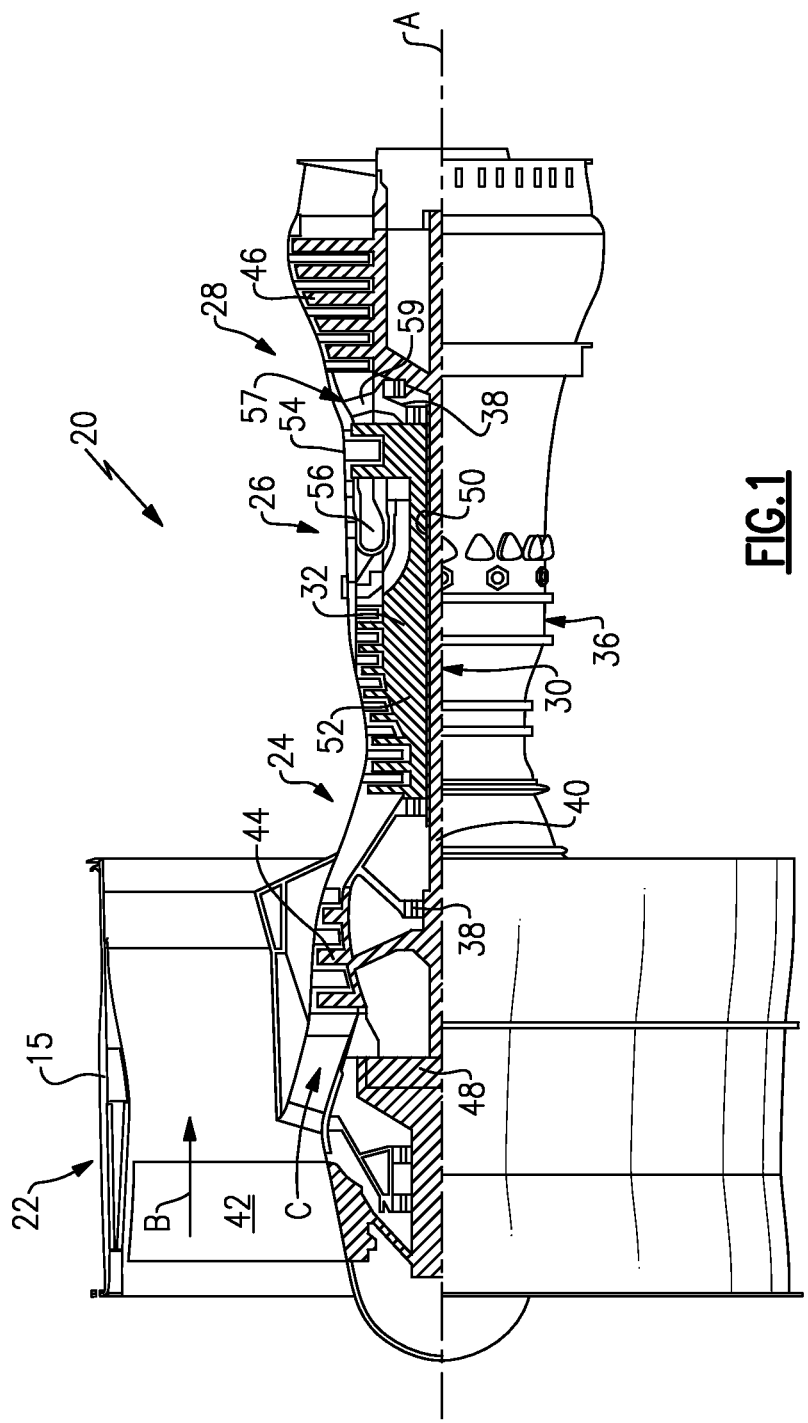
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
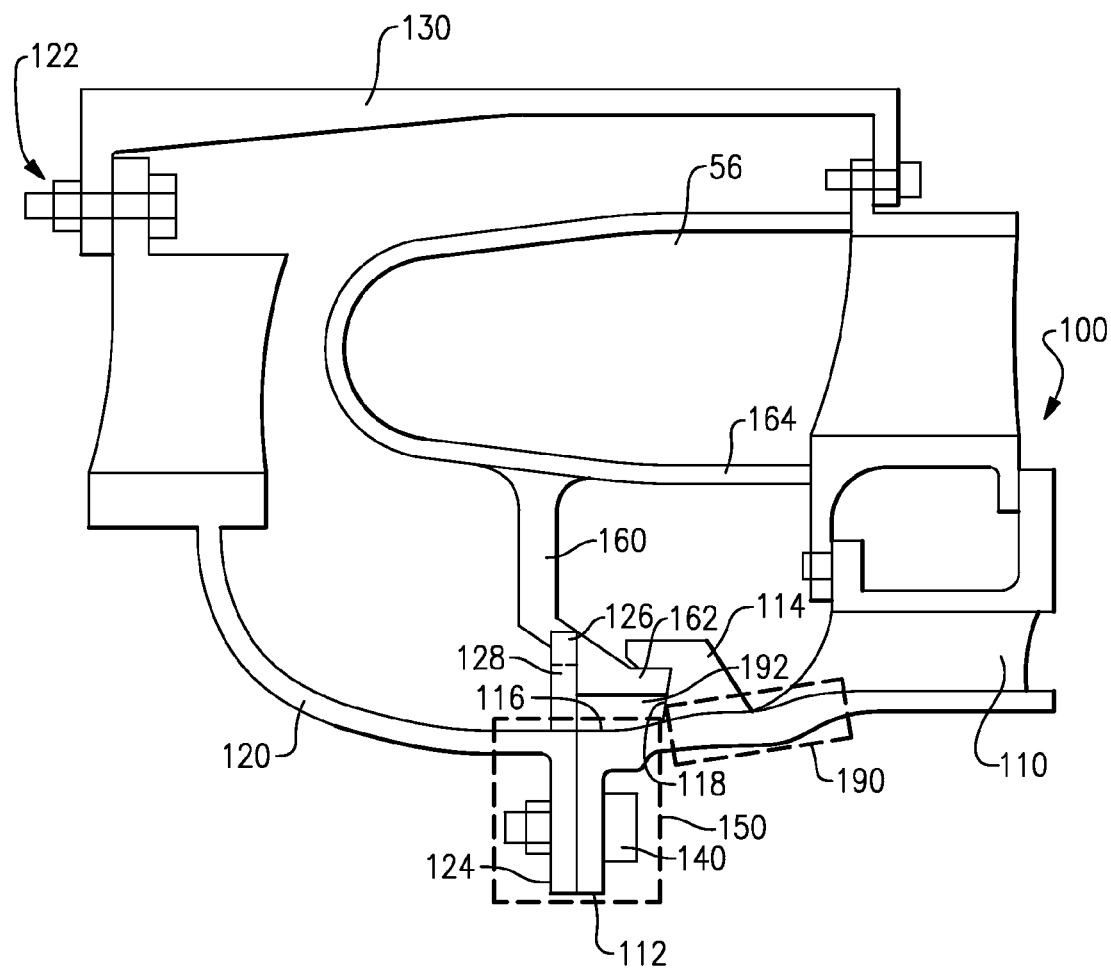
FIG. 2 schematically illustrates a combustor, turbine on-board injector (TOBI), and an inner diffuser case of the gas turbine engine of FIG. 1.

With continued reference to FIG. 1, and with like numerals indicating like elements, FIG. 2 illustrates a support structure 100 for supporting the combustor 56 and a Turbine On-Board Injector (TOBI) 110 system. The support structure 100 includes an inner diffuser case 120 that is structurally supported by, and connected to, an outer diffuser case 130 via a standard joint 122. The inner diffuser case 120 supports the TOBI 110 system and the combustor 56 using a low thermal mass joint 150.

The inner diffuser case 120 includes a connection flange 124 that is connected to a TOBI flange 112 via a fastener 140 in a known flange configuration. The combustor 56 is supported by multiple combustor arms 160 that are disposed circumferentially about an inner diameter edge 164 of the combustor 56. Each of the combustor arms 160 fits between a hook feature (referred to as a TOBI hook 114) protruding from an axially aligned face 116 of a TOBI arm 190. The TOBI hooks 114 extend radially outwards from the axially aligned face 116 of the TOBI arm 190 and include a radially aligned surface 118.

In a similar manner to the TOBI arm 190, the diffuser flange 124 includes a diffuser tab 126 that extends radially outward from the diffuser flange 124. In alternate examples, the diffuser tab 126 extends from the inner diffuser case 120 rather than the diffuser case flange 124. The diffuser tab 126 includes a radially shorter diffuser tab wall 128 (visible in isometric FIG. 4). Each combustor arm 160 includes an axially aligned portion 162 that is positioned between the diffuser tab wall 128 and the TOBI hook 114. The axially aligned portion 162 is maintained in position via an interference fit between the radially aligned surface 118 of the TOBI hook 114 and the diffuser tab wall 128.

A thermal expansion gap 192 is located between the axially aligned portion 162 of each combustor arm 160 and the axially aligned face 116 of the TOBI arm 190. The thermal expansion gap 192 provides room for the combustor arm 160, the TOBI hook 114, and the inner diffuser case 120 to thermally expand and contract while still providing structural support to the combustor 56 and to the TOBI 110.

During typical operations of the gas turbine engine 20, the TOBI 110 system reaches extremely high temperatures relative to the temperature at the low thermal mass joint 150. When the low thermal mass joint 150 has a large thermal mass, this heat is absorbed by the low thermal mass joint 150, and the TOBI arm 190 is subjected to large thermal gradients. The larger the thermal mass at the low thermal mass joint 150, the greater the magnitude of the thermal gradient seen by the TOBI arm 190 will be. Large thermal gradients can weaken the TOBI arm 190 resulting in premature breakage or crack initiation. By utilizing combustor arms 160 in conjunction with the TOBI hook 114 and the diffuser tab 126, the additional thermal mass due to the combustor support portion of the low thermal mass joint 150 is minimized, effecting a significant reduction in the thermal mass at the low thermal mass joint 150.

Figure 3:
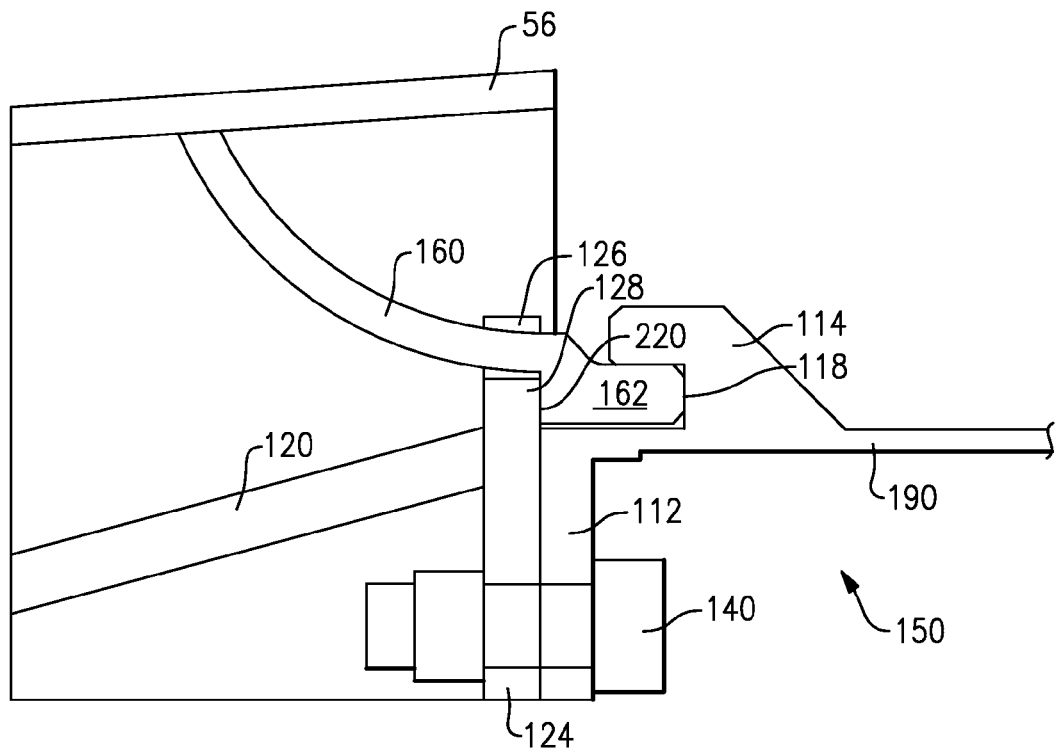
FIG. 3 schematically illustrates a cross sectional view of a support joint for a combustor and a TOBI.

With continued reference to FIG. 2, and with like numerals indicating like elements, FIG. 3 schematically illustrates an axial cross section of the low thermal mass joint 150 of FIG. 2 in greater detail and isolated from the surrounding components. As with the example of FIG. 2, the inner diffuser case 120 and the TOBI arm 190 are connected via a diffuser flange 124 and a TOBI flange 112 with a fastener 140 connecting the flanges 124, 112. The TOBI hook 114 and combustor arm 160 interface is radially offset from the flanges 112, 124, thereby reducing the total thermal mass of the low thermal mass joint 150.

The axially aligned portion 162 of the combustor arm 160 is tightly fit between a diffuser tab wall 220 and the radially aligned surface 118 of the TOBI hook 114. In this way, the combustor arm is maintained in the low thermal mass joint 150 via an interference fit between the diffuser tab 128, the TOBI hook 114, and the axially aligned portion 162 of the combustor arm 160. A diffuser tab extension 126 extends radially adjacent to the combustor arm 160, and prevents the combustor 56 from shifting circumferentially once the low thermal mass joint 150 has been assembled.

In the example of FIGS. 2 and 3, the TOBI hook 114 is located immediately radially outward of the connected flanges 112, 124. Depending on the available space in a given engine design, the TOBI hook 114 can be located further along the TOBI arm 190, thereby further separating the TOBI hook 114 and combustor arm 160 arrangement from the flanges 112, 124 and further reducing the thermal mass at the low thermal mass joint 150. In this example, the diffuser tab 126 protrudes from a diffuser arm that extends along the TOBI arm 190, rather than extending radially outward from the diffuser flange 124. In all other respects the alternate embodiment is functionally the same.

Figure 4:
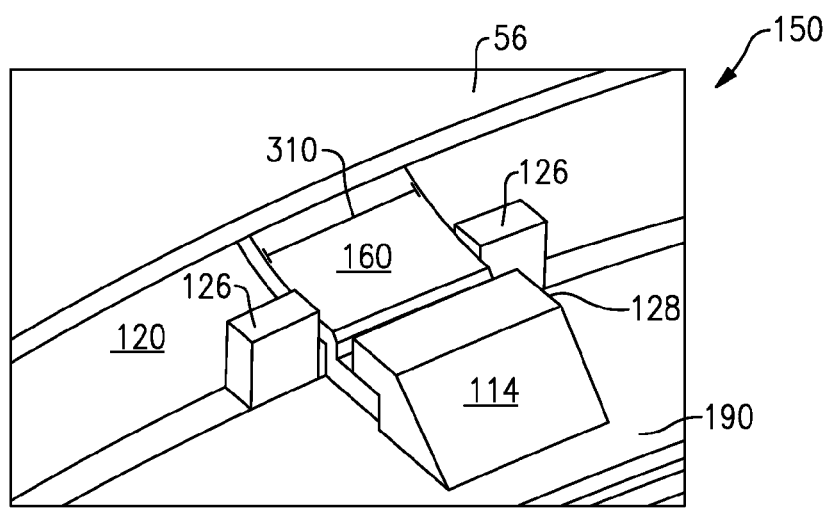
FIG. 4 schematically illustrates an isometric view of a support joint.

With continued reference to the example of FIGS. 2 and 3, and with like numerals indicating like elements, a schematic isometric view of a single low thermal mass joint 150 is illustrated in FIG. 4. In the example of in FIG. 4, the inner diffuser case 120 and the TOBI arm 190 are circumferential components that extend a full circumference of the turbine engine 20. In alternate examples, the inner diffuser case 120 and the TOBI arm 190 can be segmented components, joined together to form a complete circumferential component. Similarly, the combustor 56 extends the full circumference within the turbine engine 20, making a completed ring.

As described above, the combustor 56 is structurally supported by multiple individual combustor arms 160. The combustor arms 160 have a relatively short circumferential dimension 310, compared to the inner diffuser case 120 and the tangential on-board injector arm 190. Positioned on each side of the combustor arm 160 is a diffuser tab extension 126. The diffuser tab extensions 126 block in the combustor arm 160, and prevent circumferential rotation of the combustor 56 once the low thermal mass joint 150 is installed.

A practical implementation of an aircraft engine 20 incorporating the low thermal mass joint 150 described herein includes multiple combustor arms 160 and multiple tangential on-board injector hooks 114 spaced circumferentially about the low thermal mass joint 150. The use of individual combustor arms 160 spaced circumferentially rather than a single combustor flange that curves circumferentially about the low thermal mass joint 150 further reduces the thermal mass of the low thermal mass joint 150 and, by extension, reduces the thermal gradients that the tangential on-board injector arm 190 is exposed to.

While the above described example joints 150 are illustrated using a nut and bolt fastener type to join the diffuser case flange 124 to the tangential on-board injector flange 112, it is understood that alternate flange fasteners can be utilized to the same effect in place of the nut and bolt fastener illustrated and still fall within the instant disclosure.

While the above described low thermal mass joint 150 is illustrated and described with regards to a combustor 56 and a tangential on-board injector 110 system, one of skill in the art and having the benefit of this disclosure, will appreciate that the low thermal mass joint 150 can be applied to any structural support joint joining three circumferential components, and is not limited to a combustor 56 and a tangential on-board injector 110 system.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor section;
a diffuser case including a diffuser tab disposed at an aft end of the diffuser case, the diffuser tab including at least one pair of diffuser tab extensions protruding radially outward relative to engine longitudinal axis and a circumferential gap defined between the at least one pair of diffuser tab extensions;
the diffuser case structurally supporting a combustor section having a combustor, the combustor section being fluidly connected to said compressor section, the combustor section including at least one combustor arm extending radially inward from the combustor to the diffuser tab, wherein a radially inward end of the at least one combustor arm is received in the circumferential gap;
a turbine section fluidly connected to said combustor section;
a tangential on-board injector (TOBI) system fluidly connected to said compressor section, where the TOBI system further includes at least one TOBI arm extending forward towards the diffuser tab, a fore end of the at least one TOBI arm contacting an aft end of the diffuser case; and
the at least one TOBI arm including a TOBI hook extending radially outward from the at least one TOBI arm; and
an aft end of the at least one combustor arm being received in a radial gap defined by the TOBI hook.

2. The gas turbine engine of claim 1, wherein a first pair of diffuser tab extensions among said at least one pair of diffuser tab extensions contact a first combustor arm among the at least one combustor arm, thereby preventing circumferential movement of said combustor.

3. The gas turbine engine of claim 2, wherein said at least one pair of diffuser tab extensions comprises two diffuser tab extensions joined by a diffuser tab wall.

4. The gas turbine engine of claim 1, wherein said at least one combustor arm is maintained in an axial interference fit between a forward facing surface of the TOBI hook and an aft facing surface of the diffuser tab.

5. The gas turbine engine of claim 1, further comprising a thermal expansion gap between said at least one combustor arm and an axially extending face of said TOBI hook.

* * * * *